US006785851B1

(12) United States Patent
Franck et al.

(10) Patent No.: US 6,785,851 B1
(45) Date of Patent: Aug. 31, 2004

(54) STATISTICAL COUNTERS IN HIGH SPEED NETWORK INTEGRATED CIRCUITS

(75) Inventors: Emmanuel Franck, Binyamin (IL); Gal Alkon, Jerusalem (IL); Yoel Krupnik, Jerusalem (IL); Gabi Glasser, Talmon (IL)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 09/670,308

(22) Filed: Sep. 26, 2000

(51) Int. Cl.[7] ................................................ G06F 11/00
(52) U.S. Cl. ........................................ 714/47; 709/224
(58) Field of Search .............................. 714/4, 47, 43, 714/56; 709/224

(56) References Cited

U.S. PATENT DOCUMENTS

| 3,589,474 A | * | 6/1971 | Wavre | 187/295 |
| 3,748,451 A | * | 7/1973 | Ingwersen | 708/420 |
| 4,034,353 A | * | 7/1977 | Denny et al. | 345/440 |

(List continued on next page.)

FOREIGN PATENT DOCUMENTS

| JP | 02189046 A | * | 7/1990 | ............... 370/392 |
| JP | 05091134 A | * | 4/1993 | ............... 370/392 |
| JP | 11136236 A | * | 5/1999 | ............ G06F/13/00 |
| NL | WO 00/41361 | * | 7/2000 | ............ H04L/12/56 |

OTHER PUBLICATIONS

"Graphic Editor: Tri–State Buses Converted to a Multiplexer", 1995–2003, Altera [http//www.altera.com/support/examples/ged/g_tri2mux.html].*

Cheung et al., "Bi–directional Tristate Bux Controller" [http://www.ee.ualberta.ca/~elliott/ee552/studentAppNotes/2000_w/interfacing/bi_direction_bus/bidir_bus.html].*

"Replacing a Multiplexer by a Tri–state Bus", Lore Consulting [http://www.lore–consulting.com/portfolio/html/va/img013.gif].*

"DM74ALS245A Octal TRI–STATE Bus Transceiver", National Semiconductor, Aug. 1995.*

Primary Examiner—Robert Beausoliel
Assistant Examiner—Gabriel L Chu
(74) Attorney, Agent, or Firm—Blakely, Sokoloff, Taylor & Zafman LLP

(57) ABSTRACT

Architecture and corresponding methods share resources and synchronize counters in high-speed network integrated circuits. The architecture has at least one counter group comprising several registers, each with two ports. One port receives networking events (e.g., receipt of an-error packet, transmission of a good packet, etc.) via a tri-state bus. The registers in each counter group use a shared hardware memory element, which adds the events for each counter group. The second port is available for asynchronous external read accesses via a second tri-state bus. The architecture synchronizes read requests with events such that read accesses occur during gaps in events. The registers are assigned to several mutually exclusive counter groups such that no two registers in the counter group increment in a basic clock cycle.

15 Claims, 6 Drawing Sheets

U.S. PATENT DOCUMENTS

| | | | | |
|---|---|---|---|---|
| 4,231,106 A | * | 10/1980 | Heap et al. | 702/186 |
| 4,676,077 A | * | 6/1987 | Hirooka et al. | 68/12.27 |
| 5,003,248 A | * | 3/1991 | Johnson | 324/121 R |
| 5,097,490 A | * | 3/1992 | Hulsing et al. | 377/28 |
| 5,167,033 A | * | 11/1992 | Bryant et al. | 709/235 |
| 5,343,461 A | * | 8/1994 | Barton et al. | 370/249 |
| 5,426,741 A | * | 6/1995 | Butts et al. | 710/18 |
| 5,493,673 A | * | 2/1996 | Rindos et al. | 713/502 |
| 5,615,135 A | * | 3/1997 | Waclawsky et al. | 702/182 |
| 5,646,553 A | * | 7/1997 | Mitchell et al. | 326/86 |
| 5,699,348 A | * | 12/1997 | Baidon et al. | 370/242 |
| 5,773,994 A | * | 6/1998 | Jones | 326/41 |
| 5,838,688 A | * | 11/1998 | Kadambi et al. | 370/445 |
| 6,044,400 A | * | 3/2000 | Golan et al. | 709/224 |
| 6,065,130 A | * | 5/2000 | Glitho | 713/502 |
| 6,194,918 B1 | * | 2/2001 | Fransson et al. | 327/41 |
| 6,353,920 B1 | * | 3/2002 | Wittig et al. | 716/16 |
| 6,360,335 B1 | * | 3/2002 | Dawson | 714/39 |
| 6,415,363 B1 | * | 7/2002 | Benayoun et al. | 711/154 |

* cited by examiner

STATISTICAL COUNTERS IN HIGH SPEED NETWORK INTEGRATED CIRCUITS

RELATED APPLICATION

The present application is related to U.S. Ser. No. 09/670,307, filed Sep. 26, 2000.

BACKGROUND OF THE INVENTION

1. Field of the Invention

The invention is related to computers and computer networking, and in particular, to network statistical counters.

2. Background Information

Computer networks typically keep track of events associated with data traffic. Such events can include the number of good and bad packets transmitted, the number of good and bad packets received, the number of errors in network communications, etc. Statistical counters, which are typically located on-chip (or on a single integrated circuit), count the networking events and can be probed for information by network statistical management systems to determine whether the system should change to a backup connection because of too many errors, for example.

Statistical counters, as do all components, take up space on an integrated circuit. The more counters used, the greater the area consumed. In a design that has many counters, the counters may consume a substantial portion of the total area of the integrated circuit, which can be problematic because it increases the cost of the product, which is proportional to the total area.

Because of the increase in the demand for network manageability, the number of statistical counters that are needed is constantly increasing. As the number of statistical counters increases, the amount of integrated circuit area (or silicon) consumed increases. This causes an increase in the cost of the statistical counters as part of the total cost, and further encourages attempts to reduce the area the counters consume.

Another issue arising from advances in technology is that networking events are happening much faster than with older technologies, especially in high-speed networks. One solution is to buffer events as they enter the statistical counters. This solution, however, has proven inadequate in many instances because an extra level of complexity is added to the statistical counters to control the buffers. Another solution is to increment the statistical counters faster, which requires a faster clock. A faster clock, however, translates to more power consumption and more integrated circuit area used.

In many networking environments, the operating system normally manages events. In high-speed networks, however, the operating system may be too slow to manage networking events properly. Newer networks allow the hardware statistical counters keep track of events and permit the operating system to read the counters asynchronously. This means that the operating system does not wait for the statistical counters to stop incrementing events to read the counters.

In most communication systems, hardware memory elements, which store the value of counted events, are accessed for read by two different and asynchronous elements in the system. The first element to access hardware memory elements is the element that executes the increment calculation when a counted event occurs. The second element to access hardware memory elements is the higher-level management system (e.g., a software "driver"), which reads the value of the counter for statistical management usage. Thus, one access to the hardware memory elements is to increment the value(s) stored in the hardware memory elements and another access to read the hardware memory elements. A difficulty in such systems is how to have different statistical counter values available for read by two asynchronous elements.

One solution is to have two individual lines connected to each memory element. One set of lines is multiplexed for reading by the management element and the other set of lines is connected to the elements that execute the increment action. The lines are physical lines, however, which have to be routed on the integrated circuit. This translates to more integrated circuit area consumed.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number, in which.

DETAILED DESCRIPTION OF THE ILLUSTRATED EMBODIMENTS

Figure 1:
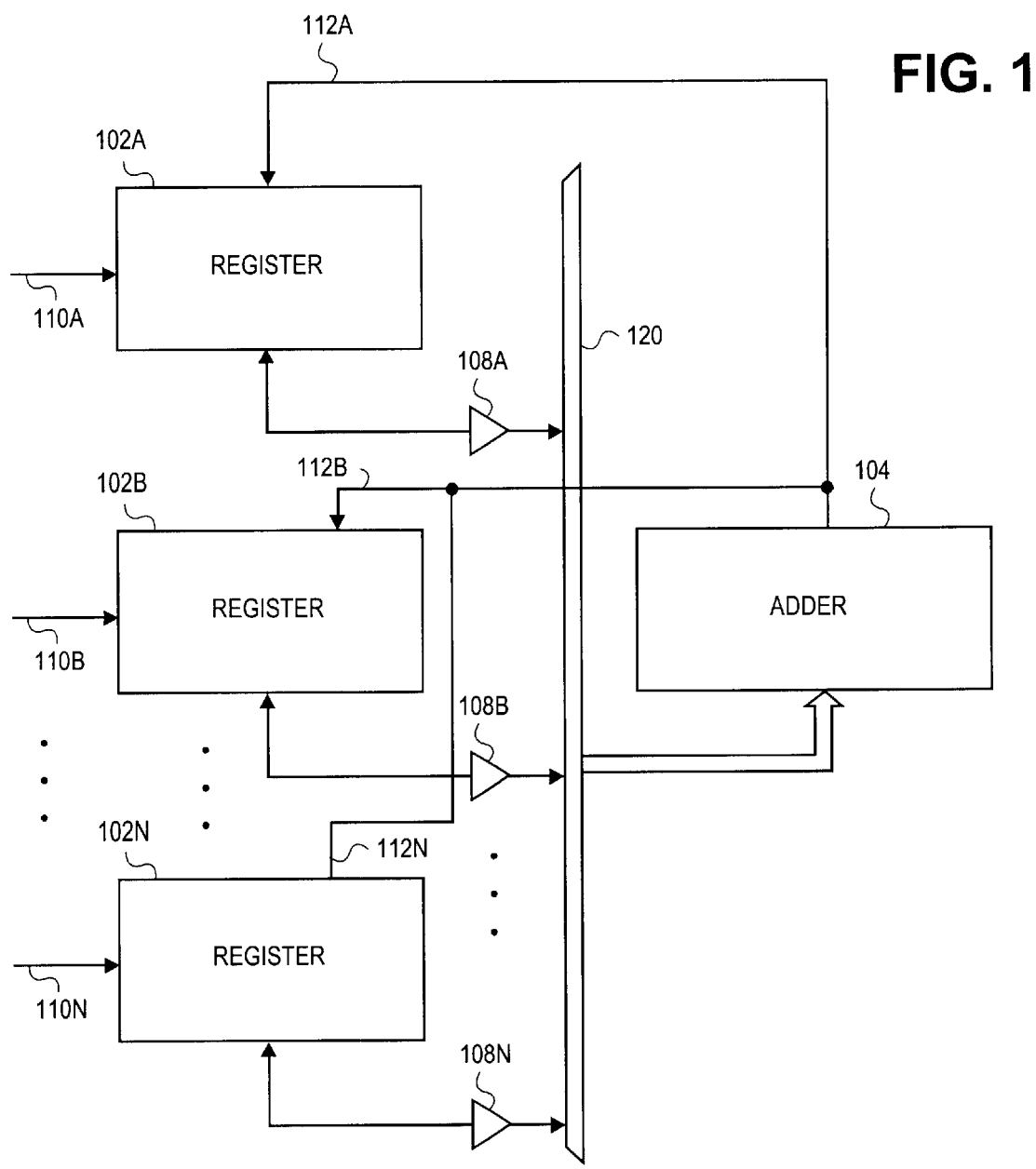
FIG. 1 is a schematic diagram of a counter group with a common adder according to an embodiment of the present invention.

A system and corresponding methods to implement statistical counters in high-speed network integrated circuits is described herein. In the following description, various aspects of the invention are described. However, it will be apparent to those skilled in the art that the invention may be practiced with only some or all aspects of the invention. For purposes of explanation, specific numbers, methods, materials and configurations are set forth in order to provide a thorough understanding of the invention. However, it will also be apparent to one skilled in the art that the invention may be practiced without the specific details. In other instances, well-known features are omitted or simplified in order not to obscure the invention.

Some parts of the description will be presented using terms such as counter, register, adder, input, output, and so forth, commonly employed by those skilled in the art to convey the substance of their work to others skilled in the art. Other parts of the description will be presented in terms of operations performed by a computer system, using terms such as reading, accessing, synchronizing, buffering, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

One aspect of the present invention reduces the area consumed by counters using a resource sharing scheme whereby a group of registers shares a common adder. Each register is coupled to a buffer, which is coupled to the common adder. A bus serves to select a register from among the group of registers to be connected to the adder such that only one register is connected to the adder at a time.

Another aspect of the present invention synchronizes asynchronous events to be counted with the counter's clock, such that the element that executes an increment calculation when a counted event accrues can do so regardless of the asynchronous nature of the events. For example, many asynchronous events arrive to be counted at any time during a basic clock cycle. A typical event include an events resulting from resetting a microprocessor by pushing the RESET button. Such asynchronous events have no reference to the clock and, as a result, the number of clocks occurring between the events cannot be determined.

Alternatively, other asynchronous events occur on the rise of a clock, but the particular clock cycle is not known. Accordingly, another aspect of the present invention synchronizes these asynchronous events with requests to read the value of a counter, such that the higher-level management system can successfully read the value of the counter for statistical management usage regardless of the asynchronous nature of the events.

As used herein, a "counter" is a hardware memory element that stores data and counts up or down (by, for example, ones, twos, tens, etc.), in response to a "count" command, for example. As such, a counter includes a "register," which is the hardware memory element that stores data and an "adder," which counts up or down. As used herein, an "incrementor" is an adder that counts up or down by a factor of one, while an adder counts up or down by any factor. As used herein, a "counter group" includes several counters sharing a common adder.

FIG. 1 is a block diagram of a counter architecture 100 that manages networking events, such as reception of data packets, networking errors, collisions, etc., as well as management of memory accesses. The counter architecture 100 uses a resource sharing scheme whereby a group of registers shares a single adder. The counter architecture 100 can be used as statistical counters, byte counters, etc.

The counter architecture 100 includes a set of registers (102). The registers 102 are intended to represent one or more individual N-bit registers, such as illustrated registers 102a, 102b, . . . , and 102n. In one embodiment, each individual register is a thirty-two bit register.

The counter architecture 100 also includes an adder 104. The adder 104 can be implemented using a carry-look-ahead adder, a simple full adder, an incrementor, etc., and depending on the implementation, can count up or down by a particular factor.

The registers 102 are coupled to a set of buffers (108), which are intended to represent one or more individual buffers, such as illustrated buffers 108a, 108b, . . . , and 108n. In one embodiment, each individual buffer 108 is an N-bit tri-state buffer, such as a thirty-two tri-state buffer.

A set of input lines (110) couples inputs to the registers 102. The set of input lines is intended to represent one or more individual input lines, such as illustrated 110a, 110b, . . . , and 110n, and correspond to the registers 102a, 102b, . . . , and 102n, respectively. Examples inputs include, but are not limited to, one or any combination of unicast packets, multicast packets, broadcast packets, short packets, normal packets, long packets, packets with errors, carrier sense errors, underflow events, collision events, etc., that are received at the inputs (or input ports). Inputs may be collectively referred to as "events."

A set of output lines (112) couples the output of the adder 104 to the registers 102. The output lines 112 are intended to represent one or more individual output lines, such as illustrated output lines 112a, 112b, . . . , and 112n, corresponding to each of the registers 102a, 102b, . . . , and 102n, respectively. In one embodiment, the output lines 112 are thirty-two lines corresponding to the thirty-two bit registers 102. In another embodiment, the output lines. 112 are sixty-four lines corresponding to sixty-four bit registers 102.

A bus 120 couples the registers 102 to the adder 104. The bus 120 also multiplexes the individual registers 102a, 102b, . . . , and 102n to the adder 104 such that only one register 102a, 102b, . . . , or 102n is connected to the adder 104 at a given time. Of course, the present invention is not limited to a particular type of bus, and in one embodiment, the bus 120 is a tri-state bus.

Although the counters and adders are sometimes depicted as separate blocks or components, the combination of registers, adders, and associated buffers and buses can be collectively referred to as "counters."

Another aspect of the invention divides the registers into several mutually exclusive counter groups, such that no two registers in a counter group may increment in the same basic clock cycle. Each mutually exclusive counter group has at least one register, which each has a pair of buffers. The counter group is coupled to an adder via a bus and to an external bus for data transfer from the registers. An advantage of this aspect is that there are no buffers to be controlled, which reduces the level of complexity of the architecture.

Figure 2:
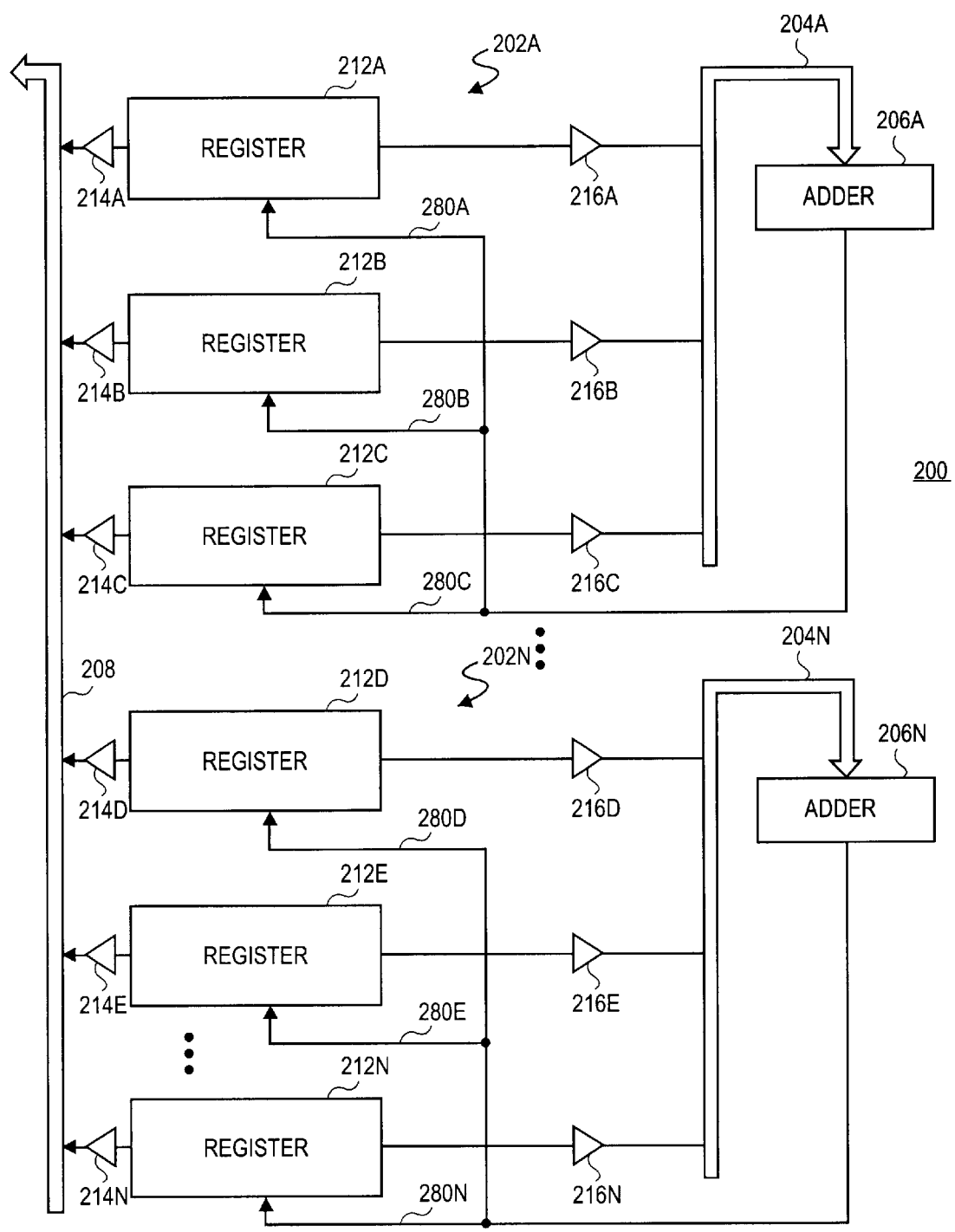
FIG. 2 is a schematic diagram of several mutually exclusive counter groups according to an embodiment of the present invention.

FIG. 2 shows a counter architecture 200 with several mutually exclusive counter groups. The counter architecture 200 has two separate buses, one to drive data from counter groups to an adder and another to connect counter groups to an external bus. The counter architecture 200 also accommodates asynchronous read requests such that the values in each counter group is available for external read accesses.

The counter architecture 200 has several mutually exclusive counter groups (202), a set of buses (204) that drives data from the counter groups 202 to a set of adders (206). The counter groups 202 are coupled to an external bus 208.

The counter groups 202 are intended to represent individual counter groups, such as illustrated counter groups 202a . . . 202n. The buses 204 are intended to represent individual buses, such as illustrated buses 204a . . . 204n and correspond to the counter groups 202a . . . 202n.

Each counter group 202 includes a set of registers (212) that store data, a set of buffers (214) that buffers signals between the registers 212 and the external bus 208, and a set of buffers (216) that buffers signals between the registers 212 and the adders 204. The buffers 214 and 216 reduce loading of the buses 202 and the external bus 208.

The registers 212 are intended to represent individual registers, such as illustrated registers 212a, 212b, 212c, 212d, 212e, . . . 212n. The buffers 214 and 216 are intended to represent individual buffers, such as illustrated buffers 214a, 214b, 214c, 214d, 214e, . . . 214n and 216a, 216b, 216c, 216d, 216e, . . . 216n, respectively. Although not shown, each register 212 has a set of input lines to couple inputs, such as events, to the registers 212 via the registers 212, similar to the set of input lines 110 that couple the inputs to the registers 212a, 212b, 212c, 212d, 212e, . . . 212n. In an embodiment, the buffers 214 and 216, the buses 204, and the external bus 208 are tri-state buses and buffers.

A set of lines (280) allows the adder 204 results (or a signal representing the results) to be read back into the registers 212a, 212b, 212c, 212d, 212e, . . . 212n. The set of lines 280 are intended to represent one or more individual lines, such as illustrated lines 280a, . . . 280n, and correspond to the registers 212a, . . . 212n, respectively.

The counter architecture 200 can be implemented in a random access memory (RAM) such that all counters in the RAM count mutually exclusive events. In this embodiment, the value of all counters is saved in the RAM. When an event occurs, the value of the selected counter is read into the adder. The result is then written back into the RAM on lines 280. Dividing the RAM into separate groups with mutually exclusive counters in each group reduces the number of rows (counters) in each group. This method is particularly useful for saving integrated circuit area when there are a minimum number of rows (or mutually exclusive counters) in each RAM group.

Recall from above that the counter architecture 200 has several mutually exclusive counter groups. In one embodiment, one mutually exclusive counter group receives the following inputs: unicast good packets received, multicast good packets received, broadcast good packets received, packets received with errors, and carrier sense errors (i.e., errors that occur between packets). Accordingly, this mutually exclusive counter group counts only events.

In another embodiment, a mutually exclusive counter group receives the following inputs: short packets (less than sixty-four bytes) transmitted without any errors, normal packets transmitted without errors, long packets (more than 1518 bytes) transmitted without errors, underflow events during transmission (transmission failed), and excessive collision events during transmission (transmission failed). This particular mutually exclusive counter group counts only these particular inputs.

Recall from above that conventional networks that use buffers to reduce the speed of events to be counted tend to be more complex than desired. According to an aspect of the invention, there are no buffers to reduce the speed of events to be counted. The counter architecture 200 nonetheless allows a lower clock speed to be used with higher frequency events.

To illustrate, in a well-known one gigabit Ethernet network, the frequency of the clock on the Media Independent Interface (MII interface) to the network is 125 megahertz. This means that the frequency of a set of events coming into the media access controller (MAC) can be 62.5 megahertz (or one to nine events every sixteen nanoseconds). Even if the basic clock of the counter architecture 200 is 500 megahertz only four increment actions can be executed during those sixteen nanoseconds. This is because in one embodiment, every increment action takes at least two basic clock cycles. Moreover, the number of events occurring at the same time can go up to nine. The basic clock of the counter architecture 200 could be 125 megahertz rather than in excess of 500 megahertz. A slower clock translates to less power consumption, as well as to less integrated circuit area consumption.

Figure 3:
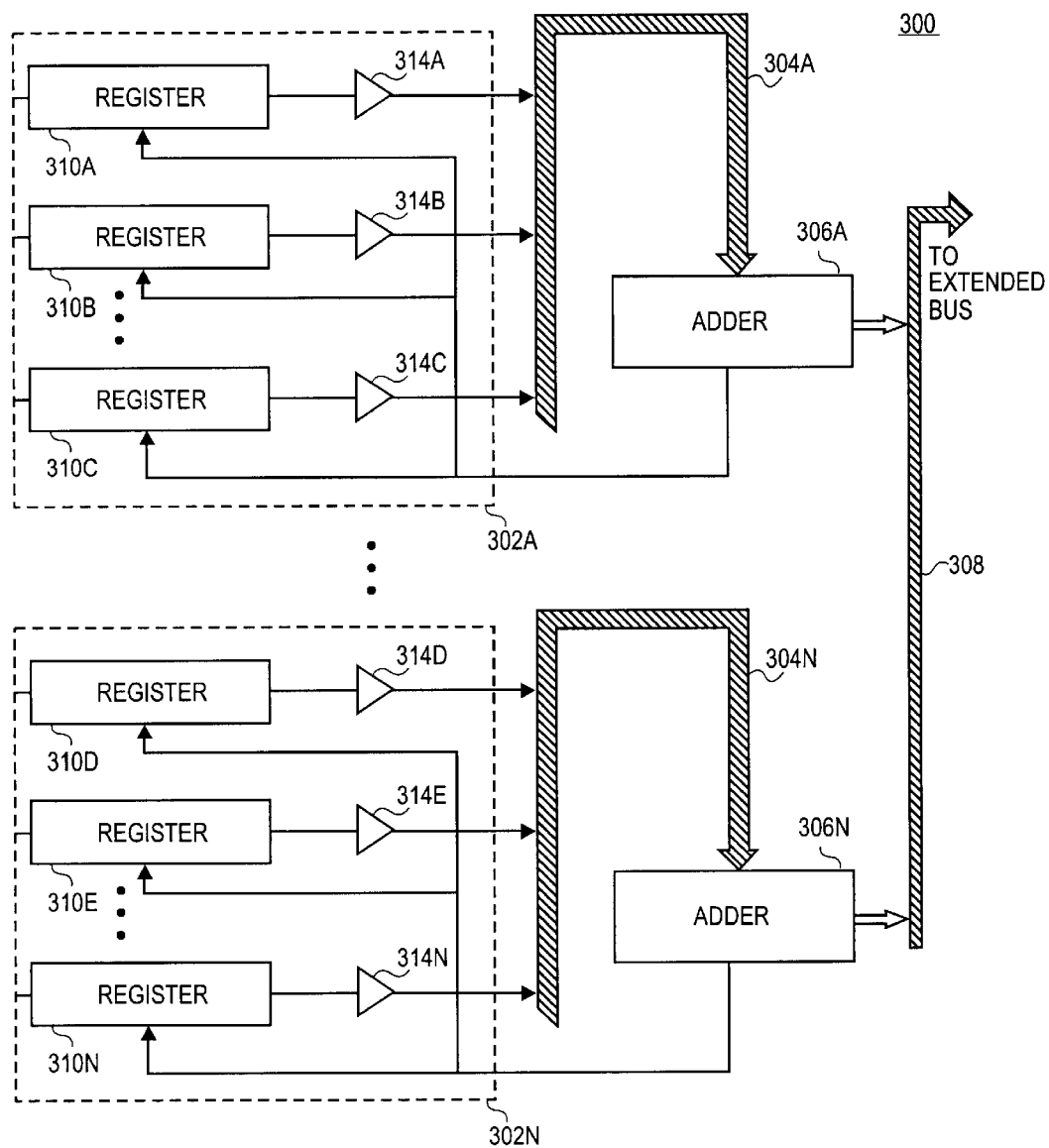
FIG. 3 is a schematic diagram of mutually exclusive counter groups with common adders coupled to an external tri-state bus according to an embodiment of the present invention.

FIG. 3 shows a counter architecture 300 that accommodates synchronous read and increment inputs according to an embodiment of the present invention. The counter architecture 300 has one bus that is used for both purposes, i.e., to drive data from registers to an adder and to connect registers to an external bus. This embodiment saves a significant portion of buffers that are used in the design, which, in turn, reduces the area consumed on the silicon chip as well as the power consumed by the circuitry.

The counter architecture 300 includes a set of counter groups (302), represented by individual counter groups 302a, . . . 302n, that share a bus (304), represented by individual buses 304a, . . . 304n. The buses 304 drive data, which represents events, to a set of adders (306), as represented by individual adders 306a, . . . 306n, and connects the counter groups 302 to an external bus 308. The external bus 308 carries data from the adders 306 out to external devices.

Each counter group 302 includes a set of registers (310), as represented by individual registers 310a, . . . 310n. The output of each individual register in the set of registers 310 is coupled to a set of buffers (314), as represented by individual registers 314a, . . . 314n. Each individual buffer 314 connects the counter groups 302 to the buses 304. Note that the number of buffers in the counter architecture 300 has been reduced to half the number of buffers that the counter architecture 200 has. In an embodiment, the buffers 314, buses 304, and external bus 308 are tri-state buses and buffers.

In many microprocessors, external read accesses are initiated by software while inputs, e.g., events, counted by the counter groups are generated by hardware. As a result, usually the frequency of external read accesses to the counter group is much lower than the frequency of events counted by the counter group. The counter group interfaces the low frequency software accesses with the high frequency events. In most communication protocols, the reply to an external read request could tolerate a certain delay.

Figure 4:
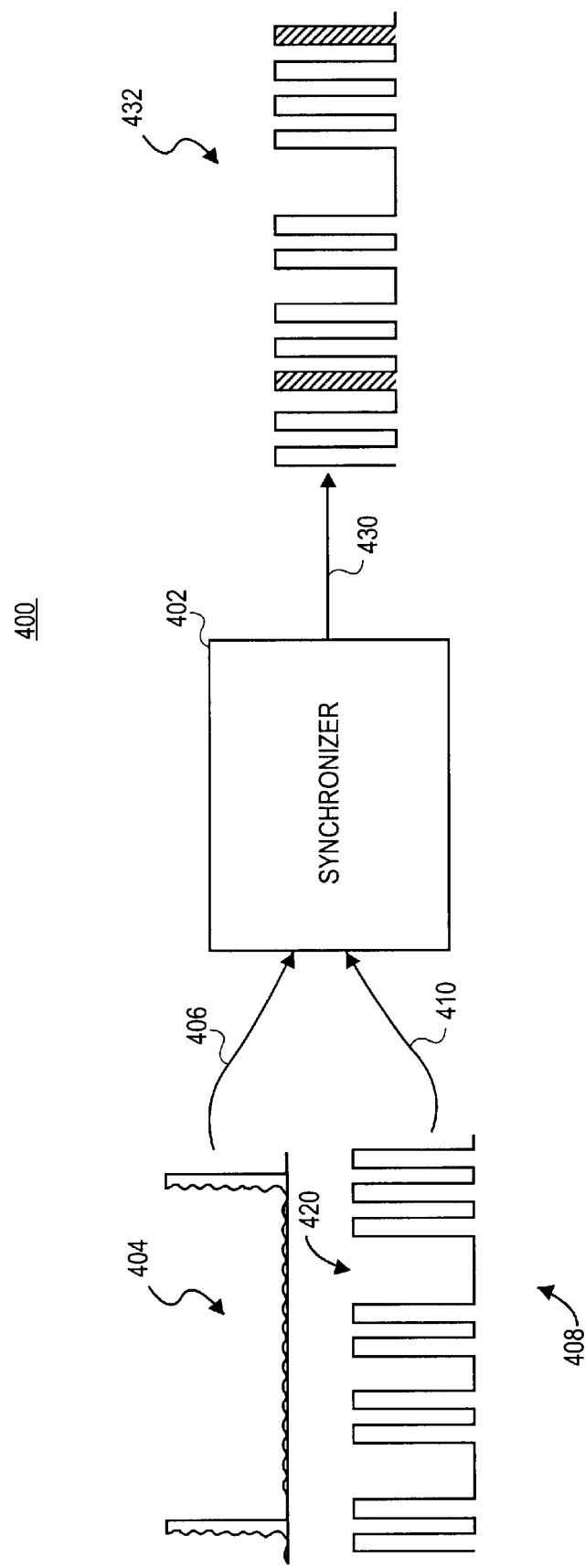
FIG. 4 shows a synchronizer and associated read request and networking event timing.

Recall from above that one aspect of the present invention is divided into several counter groups, maintaining mutual exclusivity among the registers. According to one embodiment, the external read access to the counter group is synchronized with the counted events entering the counter group. FIG. 4 shows a counter architecture 400 according to an embodiment of the present invention that synchronizes external read requests with events such that read accesses occur when there is a gap in incoming events. The counter architecture 400 includes a read access synchronizer 402, which receives a read request(s) 404 on a read request input 406 and events 408 on an event input 410.

Referring to FIG. 3 and FIG. 4, the synchronizer 402 operates as follows. When the read access synchronizer 402 receives a read request 404 it delays the read request 404 until there is a gap (420) between two counted events. The synchronizer 402 can delay the read request 404 by holding or storing the read request in a hardware memory element. A synchronizer output 430 provides synchronized read request(s) 432. During the gap 420, the bus 304, which carries data from the registers 310 to the adder 306 for the increment function, is not in use. Rather, during the gap 420, the adder 306 drives the external bus 308, which carries data from all adders 306 out to the external device making the read request 404.

Figure 5:
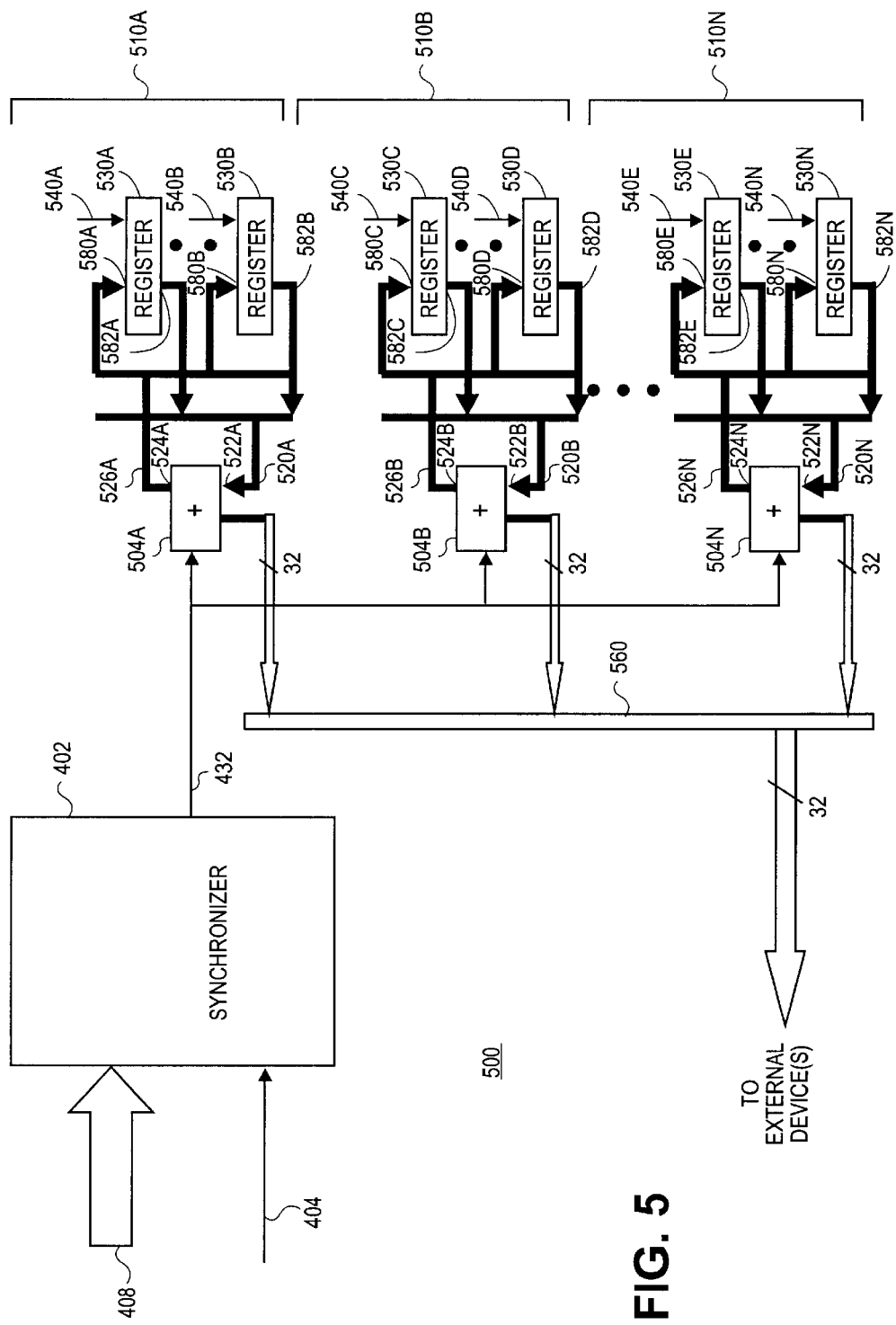
FIG. 5 is a schematic diagram of counter architecture according to an embodiment of the present invention.

FIG. 5 shows a counter architecture 500 according to an embodiment of the present invention that synchronizes read requests with events and increments events. The synchronized read requests 432 are coupled to adders 504a, 504b, ... and 504n. The adders 504a, 504b, ... and 504n are coupled to a set of mutually exclusive counter groups 510a, 510b, ... and 510n, respectively, via a set of buses 520a, 520b, ... and 520n, respectively.

The adders 504a, 504b, ... and 504n are coupled to a set of input ports 580a, 580b, ... and 580n, and a set of output ports 582a, 582b, ... and 582n. The set of input ports 580a, 580b, ... and 580n receive events from the adders 504. The set of output ports 582a, 582b, ... and 582n send or transmit events or data associated with events to the adders 504.

Events are coupled into to a set of registers 530a, 530b, ... and 530n via event input ports 540a, 540b, ... and 540n, respectively. In one embodiment, the adders 504 are thirty-two bits wide, and are coupled to an external tri-state bus 560. The external to tri-state bus 560 connects the counter architecture 500 to one or more external devices.

The set of buses 520a, 520b, ... and 520n are coupled to a set of input ports 522a, 522b, ... and 522n, respectively. The set of input ports 522a, 522b, ... and 522n receive data and/or events from the registers 530a, 530b, ... and 530n, respectively.

The 504a, 504b, ... and 504n each has a set of output ports 524a, 524b, ... and 524n coupled to a set of buses 526a, 526b, ... and 526n, respectively. The set of output ports 524a, 524b, ... and 524n send or transmit data and/or events to the set of registers 530a, 530b, ... and 530n via the set of buses 526a, 526b, ... and 526n, respectively.

Figure 6:
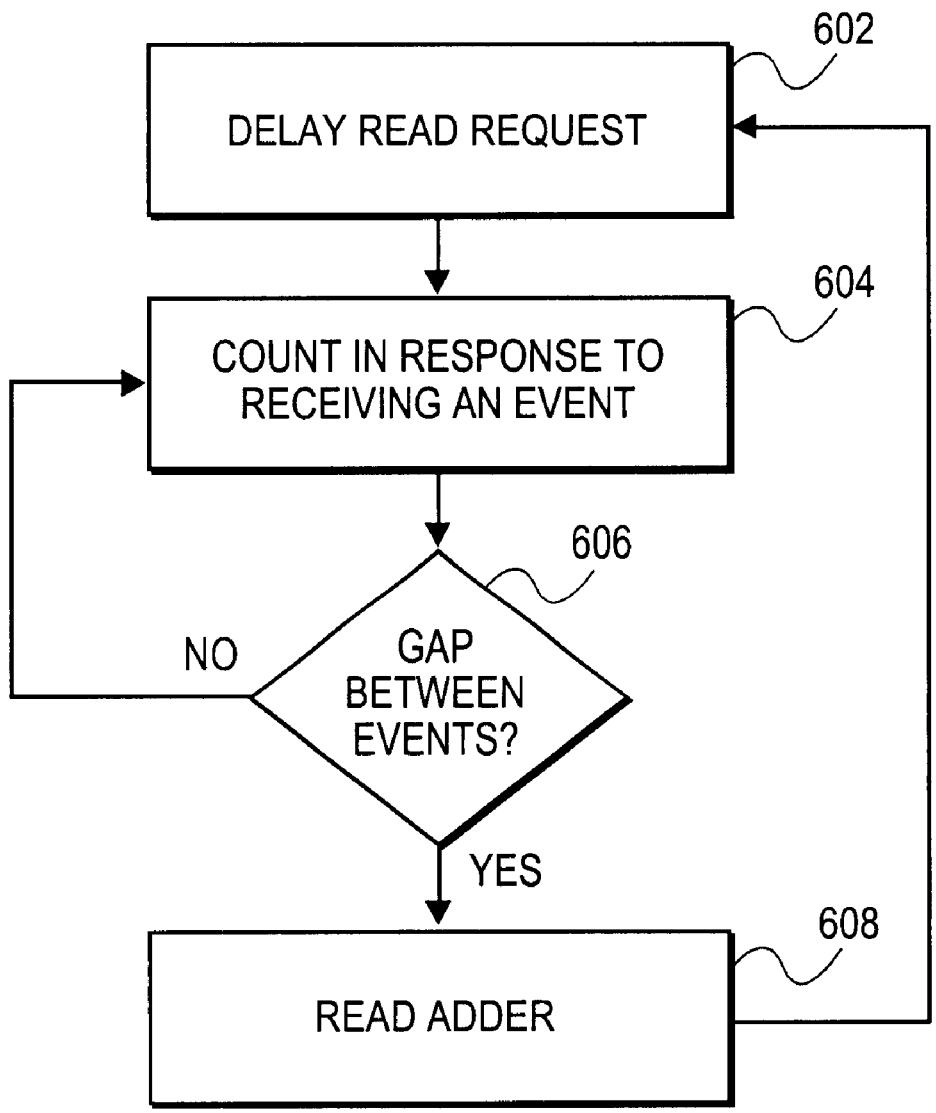
FIG. 6 shows a method to implement counters according to an embodiment of the present invention.

FIG. 6 is a flowchart describing a method 600 for implementing statistical counters in high-speed network integrated circuits. The synchronizer 402 delays a read request (602). The read request can be from any external device that wants to read values stored in the registers or adders. The adder counts in response to receiving an event (604) from a register.

The counter architecture determines whether there is a gap following the event and before the next event (606). In an embodiment, the counter architecture looks at events over several clock cycles. The counter architecture may see an event in the first clock cycle, an event in the next clock cycle, but no event in the following clock cycle. In that case, the counter architecture interprets the lack of an event as gap in events. That is, a gap occurs when there is no incoming event during a clock cycle.

If there is not a gap between two events, the adder counts in response to receiving the next event (604). If there is a gap between two events, the read request is sent to the adder for the appropriate counter group and to the appropriate register within this counter group. The adder allows the external device to read the value(s) stored in the adder (608) or the register. When there are more incoming read requests they also are delayed (602), as the method is iterative. In many management systems, an additional read request will not be generated by the management system unless the previous read request was answered. For other management systems there is an option of having the synchronizer store and remember multiple read requests.

In one embodiment, loss of events may depend on several parameters. As used herein, "$T_{read}$" is the time that an external read request may be tolerated. As used herein, "$T_{ev}$" is the smallest gap between two events in the same counter group. As used herein, "$N_{ev}$" is the number of events from the same counter group that can occur with a gap of $T_{ev}$ between them (the events). As used herein, "$T_{inc}$" is the time it takes to increment one counter. The probability of a loss of events is reduced when $T_{inc}$ is less than or equal to $T_{ev}$ and $T_{read}$ is greater than or equal to $(N_{ev}) \times (T_{inc})$. Of course, $T_{read}$ can be less than $(N_{ev}) \times (T_{inc})$.

In some networks, there are events that do not require exact counting (e.g., events that are caused by noise). From the description provided herein, a person of ordinary skill in the relevant arts would know how to implement managing events that do not require exact counting.

Aspects of the invention can be implemented using hardware, software, or a combination of hardware and software. Such implementations include state machines, application specific integrated circuits (ASICs), field programmable gate arrays, (FPGA), etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a first counter group having a first set of N-bit registers, only one of the N-bit registers to increment in a clock cycle in response to a first input received, the first input being one of a first set of inputs designated to be received by the first counter group;
   a first adder to increment in response to incrementing the only one N-bit register in the first counter group;
   a second counter group having a second set of N-bit registers, only one N-bit register in the second counter group to increment in the clock cycle in response to a second input received, the second input being one of a second set of inputs designated to be received by the second counter group, the second input being different from the first input; and
   a second adder to increment in response to incrementing the only one N-bit register in the second counter group.

2. The apparatus of claim 1, wherein the incrementor is coupled to increment or decrement by an integer factor.

3. The apparatus of claim 1, further comprising a first set of buffers and a second set of buffers coupled between the first set of N-bit registers and second set of N-bit registers and the first and second adders, respectively.

4. The apparatus of claim 3, further comprising a first bus and a second bus coupled between the first and second set of buffers, and the first and second adder.

5. The apparatus of claim 1, wherein the first and second adders comprise a register, a counter, an incrementor, or an adder.

6. A method, comprising:

incrementing only one N-bit register in a first counter group in a clock cycle in response to a first input received, the first input being one of a first set of inputs designated to be received by the first counter group;

incrementing a first adder in response to incrementing the only one N-bit register in the first counter group;

incrementing only one N-bit register in a second counter group in the clock cycle in response to a second input received, the second input being one of a second set of inputs designated to be received by the second counter group, the second input being different from the first input; and incrementing a second adder in response to incrementing the only one N-bit register in the second counter group.

7. The method of claim of claim 6, further comprising incrementing a register, a counter, an incrementor, or an adder in response to incrementing the only one N-bit register in the first or the second counter group.

8. The method of claim of claim 6, further comprising driving data from the first and the second counter groups to the first and second adders using a first bus.

9. The method of claim of claim 8, further comprising driving data from the first and the second counter groups to the first and second adders using a tri-state bus.

10. The method of claim of claim 8, further comprising carrying data from the first and second adders to devices using a second bus.

11. An article of manufacture, comprising a machine-accessible medium including data that, when accessed by a machine, cause the machine to perform the operations comprising:

incrementing only one N-bit register in a first counter group in a clock cycle in response to a first input received, the first input being one of a first set of inputs designated to be received by the first counter group;

incrementing a first adder in response to incrementing the only one N-bit register in the first counter group;

incrementing only one N-bit register in a second counter group in the clock cycle in response to a second input received, the second input being one of a second set of inputs designated to be received by the second counter group, the second input being different from the first input; and incrementing a second adder in response to incrementing the only one N-bit register in the second counter group.

12. The article of manufacture of claim 11, wherein the machine-accessible medium further includes data that cause the machine to perform operations comprising incrementing a register, a counter, an incrementor, or an adder in response to incrementing the only one N-bit register in the first or the second counter group.

13. The article of manufacture of claim of claim 11, wherein the machine-accessible medium further includes data that cause the machine to perform operations comprising driving data from the first and the second counter groups to the first and second adders using a first bus.

14. The article of manufacture of claim of claim 13, wherein the machine-accessible medium further includes data that cause the machine to perform operations comprising driving data from the first and the second counter groups to the first and second adders using a tri-state bus.

15. The-article of manufacture of claim of claim 13, wherein the machine-accessible medium further includes data that cause the machine to perform operations comprising carrying data from the first and second adders to devices using a second bus.

* * * * *